(12) United States Patent
Roesler

(10) Patent No.: US 9,222,676 B2
(45) Date of Patent: Dec. 29, 2015

(54) SUPERCRITICAL OR MIXED PHASE FUEL INJECTOR

(75) Inventor: Timothy C. Roesler, Plainfield, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 943 days.

(21) Appl. No.: 13/336,670

(22) Filed: Dec. 23, 2011

(65) Prior Publication Data
US 2012/0167582 A1 Jul. 5, 2012

Related U.S. Application Data

(60) Provisional application No. 61/428,751, filed on Dec. 30, 2010.

(51) Int. Cl.
F23R 3/30 (2006.01)
F02C 9/28 (2006.01)
F02C 9/48 (2006.01)
F23K 5/14 (2006.01)
F23N 1/00 (2006.01)

(52) U.S. Cl.
CPC ... *F23R 3/30* (2013.01); *F02C 9/28* (2013.01); *F02C 9/48* (2013.01); *F23K 5/14* (2013.01); *F23N 1/002* (2013.01); *F23K 2301/10* (2013.01); *F23K 2301/20* (2013.01); *F23N 2041/20* (2013.01)

(58) Field of Classification Search
CPC .............. F02C 9/38; F02C 9/32; F02C 9/28; F02C 7/22; F02C 7/232
USPC .............. 60/39.281, 800, 734, 737–748, 776
See application file for complete search history.

(56) References Cited

U.S. PATENT DOCUMENTS

| | | | |
|---|---|---|---|
| 5,426,933 A | 6/1995 | Maden et al. | |
| 6,141,954 A | 11/2000 | Sowa et al. | |
| 6,276,141 B1 * | 8/2001 | Pelletier | 60/740 |
| 6,775,984 B2 * | 8/2004 | Lavie et al. | 60/740 |
| 2002/0088234 A1 | 7/2002 | Brundish et al. | |
| 2002/0092302 A1 * | 7/2002 | Johnson et al. | 60/737 |
| 2004/0079086 A1 * | 4/2004 | Smith et al. | 60/776 |
| 2006/0213200 A1 * | 9/2006 | Critchley et al. | 60/773 |
| 2007/0101727 A1 | 5/2007 | Prociw | |
| 2007/0163263 A1 | 7/2007 | Thomson | |

* cited by examiner

Primary Examiner — Craig Kim
(74) Attorney, Agent, or Firm — Brinks Gilson & Lione

(57) ABSTRACT

An apparatus is disclosed including a main fuel supply fluidly coupled to a main fuel valve and an arcuate fuel passage receiving main fuel through the main fuel valve. The arcuate fuel passage includes a passage diameter and a radius of curvature which provides sufficient rotational acceleration to the main fuel such that a liquid portion of the main fuel is deposited on an outer wall of the arcuate fuel passage. The apparatus includes a fuel injector nozzle that receives the main fuel from the arcuate fuel passage, and injects the main fuel into a combustion chamber for a turbine engine. The apparatus further includes a pilot fuel supply fluidly coupled to a pilot fuel passage and a fuel selector structured to selectively provide the main fuel or the pilot fuel to the fuel injector nozzle.

21 Claims, 3 Drawing Sheets

SUPERCRITICAL OR MIXED PHASE FUEL INJECTOR

RELATED APPLICATIONS

The present application claims the benefit of U.S. Provisional Patent Application No. 61/428,751 filed Dec. 30, 2010 which is incorporated herein by reference.

BACKGROUND

The present application relates to fuel injection in a turbine engine, and more particularly but not exclusively relates to fuel injection where the fuel is in a mixed phase or supercritical fluid state. Presently available turbine engine fuel systems have fuel passages that are sized for warmed operation where the fuel is partially or completely vaporized. However, during operating conditions where liquid fuel is present, liquid can puddle in the fuel passages and/or cause variation in the flow rate or composition of fuel at the fuel injector nozzle. Systems that are sized favorably for liquid operation can suffer vapor lock when the fuel is vaporized. Therefore, developments in the technology are desirable.

SUMMARY

One embodiment is a unique apparatus for fueling a turbine engine with two-phased or supercritical fluid. Further embodiments, forms, objects, features, advantages, aspects, and benefits shall become apparent from the following description and drawings.

DETAILED DESCRIPTION

Figure 1:
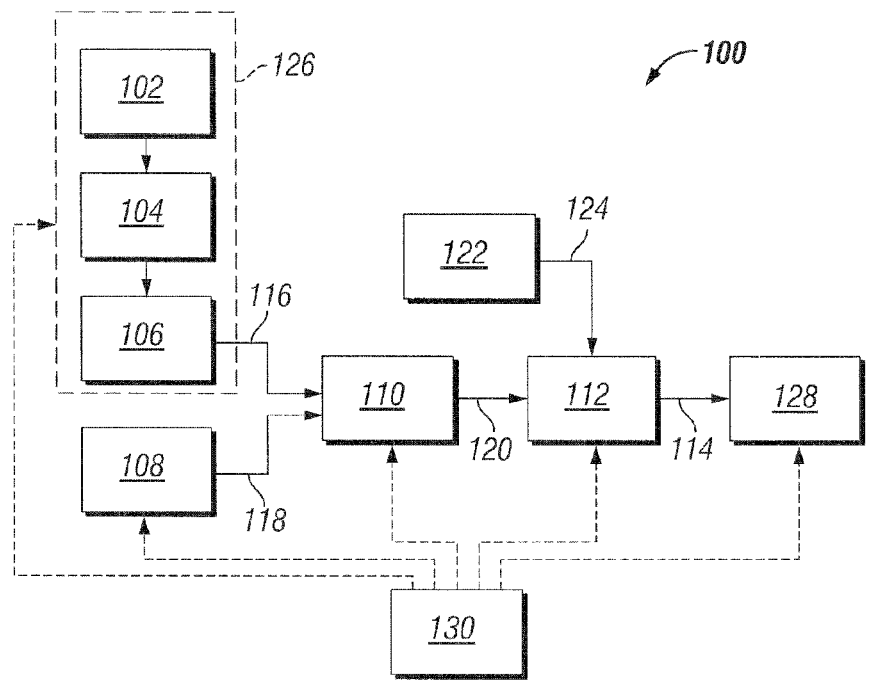
FIG. 1 is a schematic block diagram of an apparatus for supercritical or two-phased fuel injection.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

FIG. 1 is a schematic block diagram of an apparatus 100 for supercritical or two-phased fuel injection. The apparatus includes a main fuel supply 102 fluidly coupled to a main fuel valve 104. The main fuel valve 104 may be any type of valve known in the art, and in certain embodiments the main fuel valve 104 is a check valve preventing reversal of fuel flow. The main fuel valve 104 may be structured to maintain a back pressure on the main fuel supply 102, and may further or alternatively be controllable by an electronic controller 130. In certain embodiments, the main fuel valve 104 maintains a backpressure on the main fuel supply 102 such that fuel in the main fuel supply 102 is in a liquid phase.

The apparatus 100 further includes an arcuate fuel passage 106 receiving main fuel 116 through the main fuel valve 104. The arcuate fuel passage 106, in response to fuel flowing through the arcuate fuel passage 106, provides rotational acceleration to the main fuel passing through the arcuate fuel passage 106. In certain embodiments, the arcuate fuel passage 106 is a helical fuel passage having one or more loops or partial loops. Helical as used herein describes a general geometric progression of the arcuate fuel passage 106 in an axially proceeding series of loops, which may comprise a helix or a looping structure resembling a helix. The arcuate fuel passage 106 includes a passage diameter and a radius of curvature that provides sufficient rotational acceleration to the main fuel 116 such that a liquid portion of the main fuel is deposited on an outer wall of the arcuate fuel passage 106.

The rotational acceleration experienced by the main fuel is determined by the flow velocity of the main fuel (including the radial flow velocity profile within fuel passage due to near-wall effects) and the radius of curvature of the arcuate fuel passage 106. The velocity of the fuel is determined by the volumetric flow rate of the fuel and the diameter of the arcuate fuel passage 106. The volumetric flow rate range of the fuel is determined by the rated power of a turbine engine receiving fuel from the arcuate fuel passage 106, the turndown ratio of the engine, and the range of operating pressures and temperatures experienced in the arcuate fuel passage 106. The phase mix of the fuel, including the state (i.e. vapor, liquid, or supercritical) and/or the mixture of states (e.g. 95% vapor and 5% liquid) can be determined according to a phase diagram with knowledge of the fuel composition. Accordingly, one of skill in the art can determine, with the benefit of the disclosures herein, the range of fuel velocities at operating regions where liquid is present in the arcuate fuel passage 106 to determine the radius of curvature such that the liquid portion of the fuel is deposited on the wall of the arcuate fuel passage 106 to prevent puddling or blocking of fuel passing through the passage 106 and to ensure that the fuel exiting the arcuate fuel passage 106 has a uniform composition.

The apparatus 100 further includes a pilot fuel supply 108 fluidly coupled to a pilot fuel passage and a fuel selector 110 that selectively provides the main fuel 116 or the pilot fuel 118 to a fuel injector nozzle 128. The fuel selector 110 may be implemented in hardware or software, and may be a single device or distributed devices. Certain non-limiting examples of a fuel selector 110 are described herein. In one example, the fuel selector 110 is a valve that allows passage from either the main fuel passage 116 or the pilot fuel passage 118. In another example, the fuel selector 110 comprises the main fuel valve 104 and a valve (not shown) controlling the pilot fuel supply 108, and a controller 130 selecting to couple either the main fuel passage 116 or the pilot fuel passage 118 to the fuel injector nozzle 112 depending upon various operating conditions. In other examples, the fuel selector 110 may be operated by the controller 130, or by actuators implemented in hardware (e.g. responsive to a temperature or pressure to selectively couple either the main fuel passage 116 or the pilot fuel passage 118 to the fuel injector nozzle 112).

The apparatus 100 further includes a controller 130 that functionally executes features of injecting supercritical or mixed phase fuel into a turbine engine. The controller 130 is implemented in hardware and/or software, and may be a single device or distributed devices. In certain embodiments, the controller 130 includes a computer readable medium having a computer program thereon, and a processor that executes functions according to the computer program. The controller 130 further includes a memory storage allowing the processor to access saved parameters and to save parameters during operations of the controller. The controller 130 is in communication with various sensors and actuators of the apparatus 100, including any valves, a main fueling subsystem 126, the pilot fuel supply 108, the fuel selector 110, the fuel injector nozzle 112, and the turbine engine combustion chamber 128. Any parameter in the apparatus 100 may be sensed, including but not limited to temperatures, pressures, and flow rates of any fluid stream 116, 118, 120, 114 and the combustion chamber 128. Any sensed parameter may be determined by a sensor or may be calculated and/or estimated according to other parameters sensed within the apparatus 100, or communicated to the controller 130 over a network, datalink, or other communication device.

Certain exemplary operations of the controller 130 are described herein. However, given embodiments of the apparatus 100 and controller 130 may include some, all, or none of the exemplary operations without limitation.

The controller 130 is structured to determine a fuel phase value and to command the fuel selector 110 to couple the main fuel passage 116 to the fuel injector nozzle 112 in response to determining that the fuel phase value is a vapor phase, a supercritical fluid phase, and/or a mixed vapor-liquid phase. In an exemplary embodiment, the controller 130 determines the fuel phase value as an estimated fuel phase at operating conditions present in the fuel injector nozzle 112, and/or determines the fuel phase value in response to a parameter consisting of a main fuel supply temperature, a main fuel supply pressure, a pilot fuel supply temperature, a pilot fuel supply pressure, an injection chamber temperature, and/or an injection chamber pressure.

The main fuel supply 102 is under pressure from the main fuel valve 104, and experiences a change in conditions upon entering the arcuate fuel passage 106 including a pressure drop. At certain conditions, especially at higher operating conditions and lower pressure in the arcuate fuel passage 106, a portion or all of the main fuel 116 may flash resulting in a vapor, mixed liquid and vapor, and/or supercritical fluid phase. The same conditions occur for the pilot fuel supply 108 passing through a pilot fuel supply valve (not shown). When a fuel supply line is too small, vaporized fuel can result in vapor lock or insufficient fueling to the combustion chamber 128 due to restrictions in the fuel line. When a fuel supply line is sized properly to flow vapor, liquid in the fuel can cause puddling or other delivery problems with the fuel, causing inconsistent amounts and composition of fuel to reach the fuel injector nozzle 112. Therefore, the pilot fuel supply 108 flows in a pilot fuel passage 118 when the operating conditions are such that the fuel phase is liquid or substantially liquid, and the main fuel supply 102 flows in a main fuel passage 116 when the operating conditions are such that the fuel phase is vapor, mixed liquid and vapor, or a supercritical fluid.

In certain embodiments, the controller 130 commands the fuel selector 110 to provide the pilot fuel to the fuel injector nozzle 112 in response to determining the turbine engine is in a startup operating period, determining a temperature is below a threshold value, and/or determining the fuel phase value is a liquid phase. Determining the engine is in a startup operating period includes determining the engine has been running for only a brief period of time (e.g. a time lower than a startup threshold time), and may further include determining that the engine was cold or had been shut down for a period of time before the startup operation.

Determining whether a temperature is below a threshold value includes accessing any temperature in the system, and comparing the temperature to a threshold temperature value, where the threshold temperature value is selected to indicate that the engine is cold or has just started. Exemplary temperatures include a temperature of any fuel stream or stored fuel, an ambient temperature, a temperature within any of the fuel passages, a temperature of the engine combustion chamber, and/or a temperature of an engine component that can be correlated to a temperature of fuel stream, injection chamber, main fuel supply, and/or pilot fuel supply.

Determining the fuel phase value is a liquid phase includes, in one example, determining or estimating the fuel composition, pressure, and temperature. In certain embodiments, the estimate of one or more of the fuel composition, pressure, and/or temperature is provided as a default value and one or more of the values is measured. In certain embodiments, a lookup table is utilized, and the fuel phase value is determined from one or more of the fuel composition, pressure, or temperature applied to the lookup table.

The apparatus 100 further includes the fuel injector nozzle 112 that receives the main fuel from the arcuate fuel passage 106, and injects the main fuel into a combustion chamber 128 for a turbine engine.

Yet another exemplary embodiment is a computer program product comprising a computer useable medium having a computer readable program, where the computer readable program when executed on a computer causes the computer to perform operations for performing mixed phase or supercritical fuel injection. The controller 130 may include the computer program product and the computer to perform operations of the computer program product.

The operations include estimating a fuel phase at operating conditions present in the fuel injector nozzle 112 of a turbine engine and determining whether the fuel phase value is a vapor phase, a supercritical fluid phase, and/or a mixed vapor-liquid phase. The operations further include selectively providing fuel from the helical passage 106 to the fuel injector nozzle 112 in response to determining whether the fuel phase value is a vapor phase, a supercritical fluid phase, and/or a mixed vapor-liquid phase. The helical fuel passage 106 includes a passage diameter and a helix diameter to provide sufficient rotational acceleration to a main fuel such that a liquid portion of the main fuel is deposited on an outer wall of the helical fuel passage.

The operations further include selectively providing fuel from a pilot fuel passage 118 to the fuel injector nozzle 112 in response to at least one selection scheme selected from the schemes consisting of: determining the turbine engine is in a startup operating period; determining a temperature is below a threshold value; and determining the fuel phase value is a liquid phase. The operations further include estimating the fuel phase in response to a main fuel supply temperature, a main fuel supply pressure, a pilot fuel supply temperature, a pilot fuel supply pressure, an injection chamber temperature, and/or an injection chamber pressure. The operations further include commanding a main fuel supply valve 104 to maintain a backpressure on the main fuel supply 102 such that fuel in the main fuel supply 102 is a liquid phase.

Figure 2:
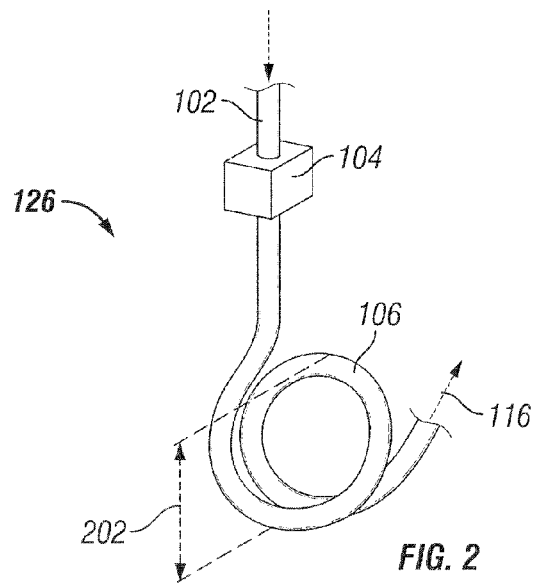
FIG. 2 is a schematic diagram of an arcuate fuel passage.

FIG. 2 is a schematic diagram of an arcuate fuel passage 106. The arcuate fuel passage 106 is configured as a helical fuel passage. The arcuate fuel passage 106 has a helix diameter 202 that defines the radius of curvature of the arcuate fuel passage 106. The arcuate fuel passage 106 further has a passage diameter according to the size of the arcuate fuel passage 106. In certain embodiments, the size of the arcuate fuel passage 106 may be defined in terms of cross-sectional area, effective diameter, effective cross-sectional area, or through other size descriptions understood in the art. The arcuate fuel passage 106 exits to the main fuel passage 116 and is fluidly coupled to the fuel injector nozzle 112. The main fuel passage 116 may be any shape understood in the art, including without limitation an annular fuel passage.

Figure 3:
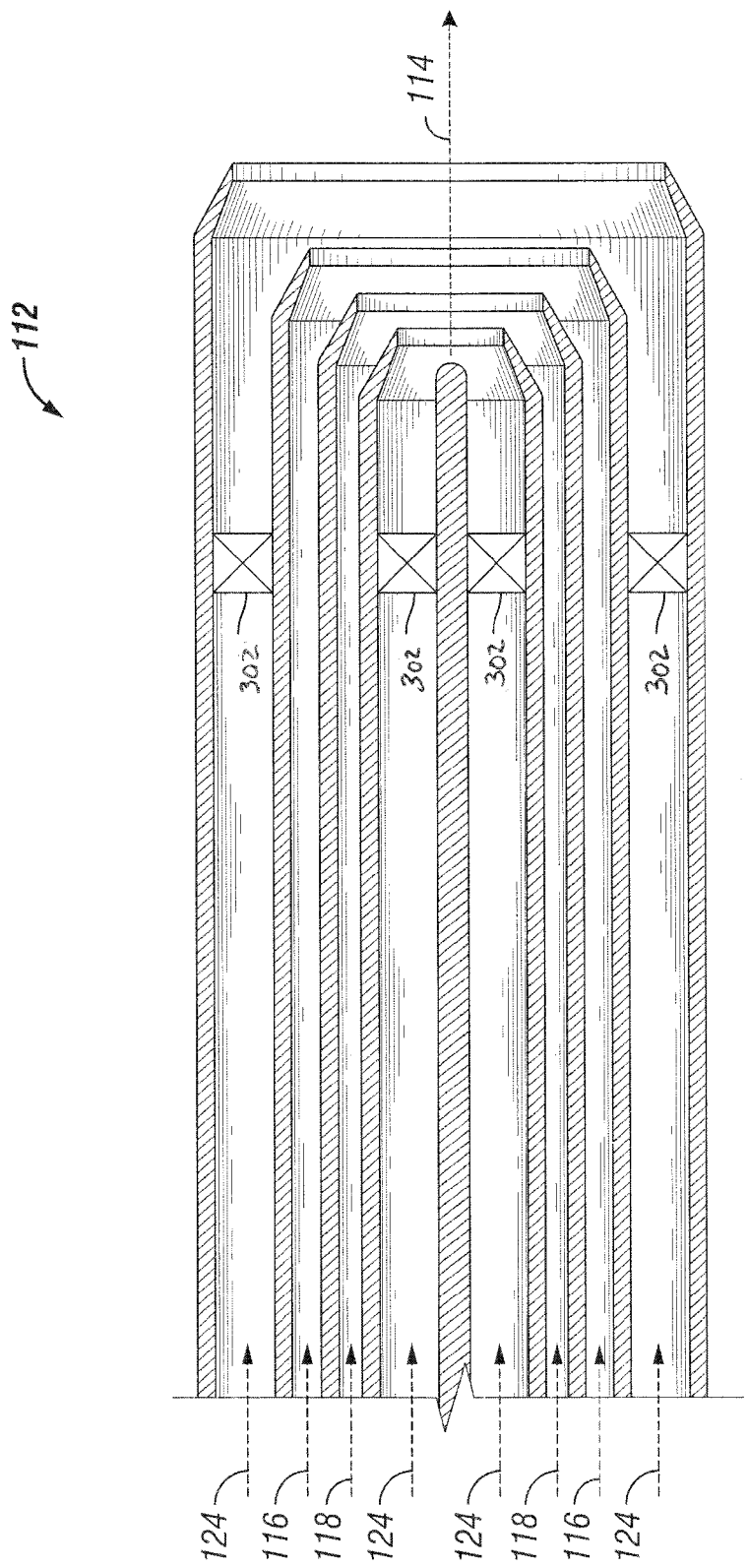
FIG. 3 is a schematic diagram of a fuel injector nozzle.

FIG. 3 is a schematic diagram of an exemplary fuel injector nozzle 112. The fuel injector nozzle 112 includes a plurality of air passages 124 with swirlers 302 to ensure injected fuel 114 to the turbine engine combustion chamber 128 is well mixed and atomized. The pilot fuel passage 118 in the exemplary embodiment is a narrow inner fuel passage and the main fuel passage 116 is a wider outer fuel passage. The sizing and positioning of the fuel passages 116, 118 may vary with the specific arrangement of components for a given embodiment of the apparatus 100. A given embodiment of the apparatus 100 may include any number of fuel injectors 112 according to the sizing of the fuel passages 116, 118 and the fuel delivery requirements for the turbine engine. The sizing and positioning of the air passages 124 are determined according to the fuel rates through the fuel passages 116, 118 and the desired properties of the injected fuel 114.

In certain embodiments, a pilot fuel circuit includes the pilot fuel supply 108, the pilot fuel passage 118, and at least a portion of the fuel injector nozzle 112. The pilot fuel circuit is configured as an airblast fuel injector or a piloted airblast fuel nozzle.

Figure 4:
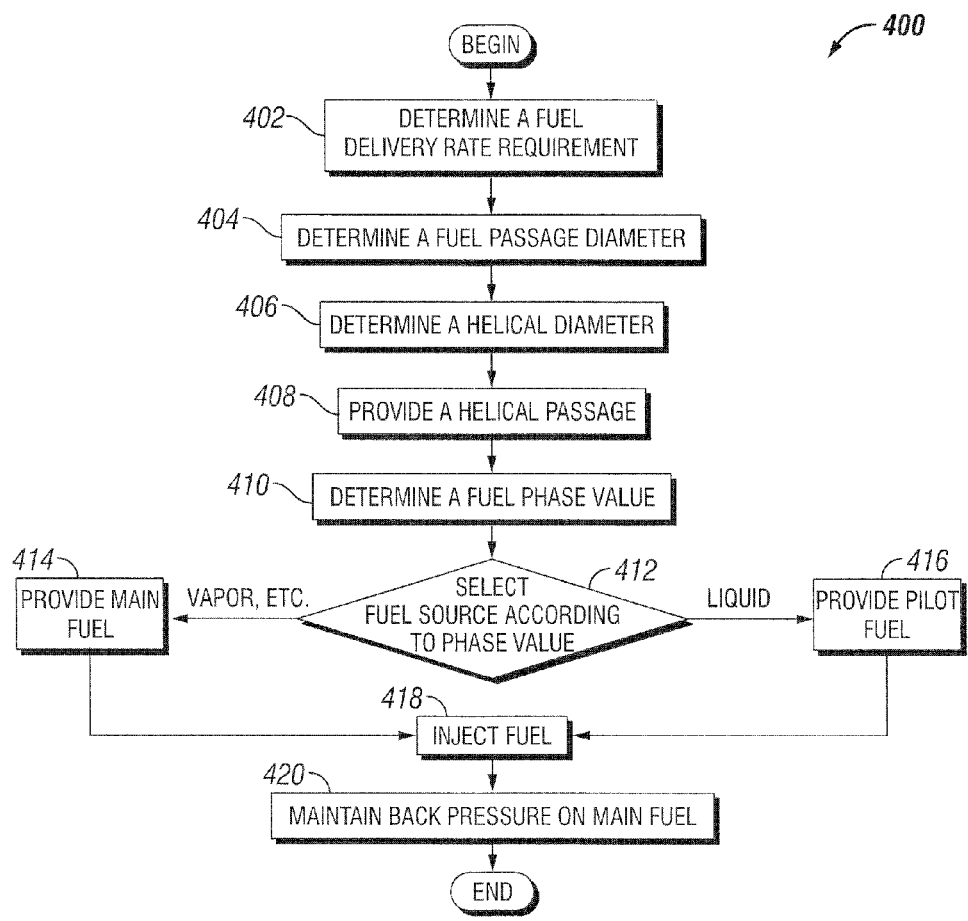
FIG. 4 is a schematic flow diagram of a procedure for super-critical or two-phased fuel injection.

The schematic flow diagrams in FIG. 4, and the related descriptions which follow, provide illustrative embodiments of performing operations for super-critical or two-phased fuel injection. Operations illustrated are understood to be exemplary only, and operations may be combined or divided, and added or removed, as well as re-ordered in whole or part, unless stated explicitly to the contrary herein.

FIG. 4 is a schematic flow diagram of a procedure 400 for super-critical or two-phased fuel injection. The procedure 400 includes an operation 402 to determine a fuel delivery rate requirement for a turbine engine, and an operation 404 to determine a fuel passage diameter in response to the fuel delivery rate requirement. The procedure 400 further includes an operation 406 to determine a helical diameter in response to the fuel passage diameter and the fuel delivery rate requirement. The operations 404, 406 to determine the helical diameter and the fuel passage diameter are calculated to ensure that rotational acceleration experienced by fuel flowing through a helical passage having the fuel passage diameter, helix diameter, is sufficient to deposit a liquid portion of the fuel on an outer wall of the helical passage at an expected fuel delivery rate.

The procedure 400 further includes an operation 408 to provide the helical passage fluidly coupled to a main fuel supply on an upstream side and a fuel injector nozzle at a downstream side. The procedure 400 further includes an operation 410 to determine a fuel phase value, and an operation 412 to select a fuel source according to the phase value. In certain embodiments, the operation 410 to determine the fuel phase value comprises estimating a fuel phase at operating conditions present in the fuel injector nozzle, and/or determining the fuel phase value in response to a main fuel supply temperature, a main fuel supply pressure, a pilot fuel supply temperature, a pilot fuel supply pressure, an injection chamber temperature, and/or an injection chamber pressure.

In certain embodiments, the operation 412 to select the fuel source comprises selecting an operation 414 to provide main fuel to a fuel injector nozzle in response to determining the fuel phase value is a vapor phase, a supercritical fluid phase, and/or a mixed vapor-liquid phase. In certain embodiments, the operation 412 to select the fuel source comprises selecting an operation 416 to provide pilot fuel to the fuel injector nozzle in response to determining a temperature is below a threshold value, in response to determining the fuel phase value is a liquid phase, and/or in response to determining a turbine engine is in a startup operating period. The operation 416 to provide pilot fuel includes providing a pilot fuel passage fluidly coupled to a pilot fuel supply at an upstream side and fluidly coupled to the fuel injector nozzle at a downstream side.

The procedure 400 includes an operation 418 to inject fuel into a combustion chamber for a turbine engine. The procedure 400 further includes an operation 420 to maintain back pressure on a main fuel supply such that fuel in the main fuel supply is a liquid phase.

Certain exemplary embodiments are contemplated herein. One exemplary embodiment is an apparatus, including a main fuel supply fluidly coupled to a main fuel valve, an arcuate fuel passage receiving main fuel through the main fuel valve. The arcuate fuel passage includes a passage diameter and a radius of curvature that provides sufficient rotational acceleration to the main fuel such that a liquid portion of the main fuel is deposited on an outer wall of the arcuate fuel passage. In certain embodiments, the arcuate fuel passage is a helical fuel passage and the radius of curvature is defined by a helix diameter. The apparatus includes a fuel injector nozzle that receives the main fuel from the arcuate fuel passage, and injects the main fuel into a combustion chamber for a turbine engine.

The apparatus further includes a pilot fuel supply fluidly coupled to a pilot fuel passage and a fuel selector that selectively provides the main fuel or the pilot fuel to the fuel injector nozzle. The apparatus further includes a controller that structured to functionally execute features of injecting supercritical or mixed phase fuel into a turbine engine. The controller is structured to determine a fuel phase value. The controller commands the fuel selector to provide the main fuel to the fuel injector nozzle in response determining that the fuel phase value a vapor phase, a supercritical fluid phase, and/or a mixed vapor-liquid phase. The controller further determines the fuel phase value as an estimated fuel phase at operating conditions present in the fuel injector nozzle, and/or determines the fuel phase value in response to a parameter consisting of a main fuel supply temperature, a main fuel supply pressure, a pilot fuel supply temperature, a pilot fuel supply pressure, an injection chamber temperature, and/or an injection chamber pressure. In certain embodiments, the controller commands the fuel selector to provide the pilot fuel to the fuel injector nozzle in response to: determining the turbine engine is in a startup operating period, determining a temperature is below a threshold value, and/or determining a fuel phase value is a liquid phase.

The main fuel valve maintains a backpressure on the main fuel supply such that fuel in the main fuel supply is a liquid phase. A pilot fuel circuit includes the pilot fuel supply, the pilot fuel passage, and at least a portion of the fuel injector nozzle. The pilot fuel circuit is configured as an airblast fuel injector or a piloted airblast fuel nozzle.

Another exemplary embodiment is a method, including determining a fuel delivery rate requirement for a turbine engine, determining a fuel passage diameter in response to the fuel delivery rate requirement, and determining a helix diameter in response to the fuel passage diameter and the fuel delivery rate requirement. In certain embodiments, the helix diameter, fuel passage diameter, and fuel delivery rate requirement are calculated to ensure that rotational acceleration experienced by fuel flowing through a helical passage with the fuel passage diameter, helix diameter, and expected fuel delivery rate is sufficient to deposit a liquid portion of the fuel on an outer wall of the helical passage. The method further includes providing the helical passage fluidly coupled to a main fuel supply on an upstream side and a fuel injector nozzle at a downstream side. The method further includes providing a pilot fuel passage fluidly coupled to a pilot fuel supply at an upstream side and fluidly coupled to the fuel injector nozzle at a downstream side, determining a fuel phase value, and selectively providing a fuel to a fuel injector nozzle from one of the helical passage or the pilot fuel passage in response to the fuel phase value. The method further includes injecting the fuel into a combustion chamber of the turbine engine.

The method further includes selectively providing fuel from the helical passage to the fuel injector nozzle in response to determining whether the fuel phase value is a vapor phase, a supercritical fluid phase, and/or a mixed vapor-liquid phase. The method further includes determining the fuel phase value by estimating a fuel phase at operating conditions present in the fuel injector nozzle. In certain embodiments, the method includes determining the fuel phase value in response to a main fuel supply temperature, a main fuel supply pressure, a pilot fuel supply temperature, a pilot fuel supply pressure, an injection chamber temperature, and/or an injection chamber pressure.

The method further includes selectively providing the fuel from the pilot fuel passage in response to determining the turbine engine is in a startup operating period. In a further embodiment, the method includes selectively providing the fuel from the pilot fuel passage in response to determining a temperature is below a threshold value. The method further includes selectively providing the fuel from the pilot fuel passage in response to determining the fuel phase value is a liquid phase. In certain embodiments, the method further includes maintaining a backpressure on the main fuel supply such that fuel in the main fuel supply is a liquid phase.

Yet another exemplary embodiment is a computer program product comprising a computer useable medium having a computer readable program, where the computer readable program when executed on a computer causes the computer to perform operations for performing mixed phase or supercritical fuel injection. The operations include estimating a fuel phase at operating conditions present in a fuel injector nozzle of a turbine engine and determining whether the fuel phase value is a vapor phase, a supercritical fluid phase, and/or a mixed vapor-liquid phase. The operations further include selectively providing fuel from a helical passage to the fuel injector nozzle in response to determining whether the fuel phase value is a vapor phase, a supercritical fluid phase, and/or a mixed vapor-liquid phase. The helical fuel passage includes a passage diameter and a helix diameter to provide sufficient rotational acceleration to a main fuel such that a liquid portion of the main fuel is deposited on an outer wall of the helical fuel passage.

The operations further include selectively providing fuel from a pilot fuel passage to the fuel injector nozzle in response to at least one selection scheme selected from the schemes consisting of: determining the turbine engine is in a startup operating period; determining a temperature is below a threshold value; and determining the fuel phase value is a liquid phase. The operations further include estimating the fuel phase in response to a main fuel supply temperature, a main fuel supply pressure, a pilot fuel supply temperature, a pilot fuel supply pressure, an injection chamber temperature, and/or an injection chamber pressure. The operations further include commanding a main fuel supply valve to maintain a backpressure on the main fuel supply such that fuel in the main fuel supply is a liquid phase.

While specific examples of the invention have been described, it is to be understood that the invention is not to be limited to the disclosed embodiment(s). Various modifications and equivalent arrangements within the spirit and scope of the appended claims, which scope is to be accorded the broadest interpretation so as to encompass all such modifications and equivalent structures as permitted under the law. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus, comprising:
   a main fuel supply fluidly coupled to a main fuel valve;
   an arcuate fuel passage receiving main fuel through the main fuel valve, wherein the arcuate fuel passage comprises a passage diameter and a radius of curvature structured to provide sufficient rotational acceleration to the main fuel such that a liquid portion of the main fuel is deposited on an outer wall of the arcuate fuel passage; and
   a fuel injector nozzle structured to receive the main fuel from the arcuate fuel passage, and to inject the main fuel into a combustion chamber for a turbine engine;
   wherein the main fuel valve is structured to maintain a backpressure on the main fuel supply such that fuel in the main fuel supply is a liquid phase.

2. The apparatus of claim 1, wherein the arcuate fuel passage comprises a helical fuel passage and wherein the radius of curvature is defined by a helix diameter.

3. The apparatus of claim 2, further comprising:
   a pilot fuel supply fluidly coupled to a pilot fuel passage; and
   a fuel selector structured to selectively provide the main fuel or the pilot fuel to the fuel injector nozzle.

4. The apparatus of claim 3, further comprising a controller structured to determine a fuel phase value and to command the fuel selector to provide the main fuel to the fuel injector nozzle in response to a determination that the fuel phase value is a phase value selected from the list of phases consisting of a vapor phase, a supercritical fluid phase, and a mixed vapor-liquid phase.

5. The apparatus of claim 4, wherein the controller is further structured to determine the fuel phase value as an estimated fuel phase at operating conditions present in the fuel injector nozzle.

6. The apparatus of claim 4, wherein the controller is further structured to determine the fuel phase value in response to at least one parameter selected from the parameters consisting of a main fuel supply temperature, a main fuel supply pressure, a pilot fuel supply temperature, a pilot fuel supply pressure, an injection chamber temperature, and an injection chamber pressure.

7. The apparatus of claim 3, further comprising a controller structured to command the fuel selector to provide the pilot fuel to the fuel injector nozzle in response to at least one selection scheme selected from the schemes consisting of:
   determining the turbine engine is in a startup operating period;
   determining a temperature is below a threshold value; and
   determining a fuel phase value is a liquid phase.

8. The apparatus of claim 3, further comprising a pilot fuel circuit comprising the pilot fuel supply, the pilot fuel passage, and at least a portion of the fuel injector nozzle, wherein the pilot fuel circuit comprises one of an airblast fuel injector and a piloted airblast fuel nozzle.

9. A method, comprising:
  determining a fuel delivery rate requirement for a turbine engine;
  determining a fuel passage diameter in response to the fuel delivery rate requirement;
  determining a helix diameter in response to the fuel passage diameter and the fuel delivery rate requirement, wherein rotational acceleration experienced by fuel flowing through a helical passage having the fuel passage diameter and the helix diameter is sufficient to deposit a liquid portion of the fuel on an outer wall of the helical passage;
  providing the helical passage fluidly coupled to a main fuel supply on an upstream side and a fuel injector nozzle at a downstream side;
  providing a pilot fuel passage fluidly coupled to a pilot fuel supply at an upstream side and fluidly coupled to the fuel injector nozzle at a downstream side;
  determining a fuel phase value;
  selectively providing a fuel to a fuel injector nozzle from one of the helical passage or the pilot fuel passage in response to the fuel phase value;
  selectively providing the fuel from the pilot fuel passage in response to determining a temperature is below a threshold value; and
  injecting the fuel into a combustion chamber of the turbine engine.

10. The method of claim 9, further comprising selectively providing fuel from the helical passage to the fuel injector nozzle in response to determining whether the fuel phase value is a phase value selected from the list of phases consisting of a vapor phase, a supercritical fluid phase, and a mixed vapor-liquid phase.

11. The method of claim 9, wherein the determining the fuel phase value comprises estimating a fuel phase at operating conditions present in the fuel injector nozzle.

12. The method of claim 9, further comprising determining the fuel phase value in response to at least one parameter selected from the parameters consisting of a main fuel supply temperature, a main fuel supply pressure, a pilot fuel supply temperature, a pilot fuel supply pressure, an injection chamber temperature, and an injection chamber pressure.

13. The method of claim 9, further comprising selectively providing the fuel from the pilot fuel passage in response to determining the turbine engine is in a startup operating period.

14. The method of claim 9, wherein the fuel from the pilot fuel passage is provided in response to determining the fuel phase value is a liquid phase.

15. The method of claim 14, further comprising maintaining a backpressure on the main fuel supply such that fuel in the main fuel supply is a liquid phase.

16. A computer program product comprising a computer useable medium having a computer readable program, wherein the computer readable program when executed on a computer causes the computer to:
  estimate a fuel phase at operating conditions present in a fuel injector nozzle of a turbine engine;
  determine whether a fuel phase value is a phase value selected from the list of phases consisting of a vapor phase, a supercritical fluid phase, and a mixed vapor-liquid phase;
  provide fuel from a helical passage to the fuel injector nozzle in response to determining whether the fuel phase value is a phase value selected from the list of phases consisting of a vapor phase, a supercritical fluid phase, and a mixed vapor-liquid phase;
  provide fuel from a pilot fuel passage to the fuel injector nozzle in response to at least one selection scheme selected from the schemes consisting of:
    determining the turbine engine is in a startup operating period;
    determining a temperature is below a threshold value; and
    determining the fuel phase value is a liquid phase; and
  wherein the helical fuel passage comprises a passage diameter and a helix diameter structured to provide sufficient rotational acceleration to a main fuel such that a liquid portion of the main fuel is deposited on an outer wall of the helical fuel passage.

17. The computer program product of claim 16, wherein the computer readable program when executed on the computer further causes the computer to estimate the fuel phase in response to at least one parameter selected from the parameters consisting of a main fuel supply temperature, a main fuel supply pressure, a pilot fuel supply temperature, a pilot fuel supply pressure, an injection chamber temperature, and an injection chamber pressure.

18. The computer program product of claim 16, wherein the computer readable program when executed on the computer further causes the computer to command a main fuel supply valve to maintain a backpressure on the main fuel supply such that fuel in the main fuel supply is a liquid phase.

19. A method, comprising:
  determining a fuel delivery rate requirement for a turbine engine;
  determining a fuel passage diameter in response to the fuel delivery rate requirement;
  determining a helix diameter in response to the fuel passage diameter and the fuel delivery rate requirement, wherein rotational acceleration experienced by fuel flowing through a helical passage having the fuel passage diameter and the helix diameter is sufficient to deposit a liquid portion of the fuel on an outer wall of the helical passage;
  providing the helical passage fluidly coupled to a main fuel supply on an upstream side and a fuel injector nozzle at a downstream side;
  providing a pilot fuel passage fluidly coupled to a pilot fuel supply at an upstream side and fluidly coupled to the fuel injector nozzle at a downstream side;
  determining a fuel phase value;
  selectively providing a fuel to a fuel injector nozzle from one of the helical passage or the pilot fuel passage in response to the fuel phase value;
  selectively providing the fuel from the pilot fuel passage in response to determining the fuel phase value is a liquid phase; and
  injecting the fuel into a combustion chamber of the turbine engine.

20. A method, comprising:
  determining a fuel delivery rate requirement for a turbine engine;
  determining a fuel passage diameter in response to the fuel delivery rate requirement;
  determining a helix diameter in response to the fuel passage diameter and the fuel delivery rate requirement, wherein rotational acceleration experienced by fuel flowing through a helical passage having the fuel passage diameter and the helix diameter is sufficient to deposit a liquid portion of the fuel on an outer wall of the helical passage;

providing the helical passage fluidly coupled to a main fuel supply on an upstream side and a fuel injector nozzle at a downstream side;

maintaining a backpressure on the main fuel supply such that fuel in the main fuel supply is a liquid phase;

providing a pilot fuel passage fluidly coupled to a pilot fuel supply at an upstream side and fluidly coupled to the fuel injector nozzle at a downstream side;

determining a fuel phase value;

selectively providing a fuel to a fuel injector nozzle from one of the helical passage or the pilot fuel passage in response to the fuel phase value; and injecting the fuel into a combustion chamber of the turbine engine.

21. A computer program product comprising a computer useable medium having a computer readable program, wherein the computer readable program when executed on a computer causes the computer to:

estimate a fuel phase at operating conditions present in a fuel injector nozzle of a turbine engine;

determine whether a fuel phase value is a phase value selected from the list of phases consisting of a vapor phase, a supercritical fluid phase, and a mixed vapor-liquid phase;

provide fuel from a helical passage to the fuel injector nozzle in response to determining whether the fuel phase value is a phase value selected from the list of phases consisting of a vapor phase, a supercritical fluid phase, and a mixed vapor-liquid phase;

wherein the helical fuel passage comprises a passage diameter and a helix diameter structured to provide sufficient rotational acceleration to a main fuel such that a liquid portion of the main fuel is deposited on an outer wall of the helical fuel passage; and command a main fuel supply valve to maintain a backpressure on the main fuel supply such that fuel in the main fuel supply is a liquid phase.

* * * * *